United States Patent [19]

Okabe et al.

[11] Patent Number: 4,991,903
[45] Date of Patent: Feb. 12, 1991

[54] DRIVE EQUIPMENT FOR OPENING AND CLOSING OF A VEHICLE TOP

[75] Inventors: Sigeki Okabe, Toyohashi; Masaya Horikawa, Shizuoka; Tatsuo Maeda, Hiroshima; Seiichi Omoto, Hiroshima; Kozo Odoi, Hiroshima, all of Japan

[73] Assignees: Asmo Co., Ltd., Kosai; Mazda Co., Ltd., Hiroshima, both of Japan

[21] Appl. No.: 227,138

[22] Filed: Aug. 2, 1988

[30] Foreign Application Priority Data

Aug. 4, 1987 [JP] Japan ................... 62-195105
Aug. 4, 1987 [JP] Japan ................... 62-195107
Oct. 31, 1987 [JP] Japan ................... 62-276292

[51] Int. Cl.$^5$ ............................................. B60J 7/12
[52] U.S. Cl. .................................. 296/112; 74/625; 192/94
[58] Field of Search ................. 296/112, 115, 117; 74/625; 192/94

[56] References Cited

U.S. PATENT DOCUMENTS

| | | | |
|---|---|---|---|
| 1,858,624 | 5/1932 | Hess et al. | 74/625 |
| 2,104,174 | 1/1938 | Simons et al. | 192/94 |
| 2,457,367 | 12/1948 | Hale | 192/94 |
| 2,692,162 | 10/1954 | Rossmann | 296/117 |
| 2,753,508 | 7/1956 | Inman | 318/483 |
| 2,912,227 | 11/1959 | Sheppard et al. | 296/100 |
| 3,116,087 | 12/1963 | Baumann et al. | 296/117 |
| 4,093,851 | 6/1978 | Paulinski | 371/28 |
| 4,644,235 | 2/1987 | Ohta | 296/117 X |
| 4,671,559 | 6/1987 | Kolb | 296/115 X |
| 4,766,356 | 8/1988 | Hawda et al. | 296/117 X |

FOREIGN PATENT DOCUMENTS 1522822 8/1978 United Kingdom .
2120427A 11/1983 United Kingdom .

*Primary Examiner*—Dennis H. Pedder
*Attorney, Agent, or Firm*—Burns, Doane, Swecker & Mathis

[57] ABSTRACT

A drive device for opening and closing a vehicle top includes a pair of control devices each fixed in the side of the vehicle body, a falling pillar swingably supporting the vehicle top on the vehicle body and a pair of extendable link mechanisms that include link rods which are inclinable and which couple a swinging arm of the respective control device with the falling pillar. Each of the control devices includes a housing in which is rotatably positioned at least a portion of an output shaft for rotating the swinging arm, a driving device attached to the housing and generating a rotary driving force, a first reduction gear stage formed as a worm drive which is coupled with the driving device and which is housed in the housing, and a second reduction gear stage formed as a spur gear drive which is coupled with the worm drive for driving the output shaft and which is housed in the housing. A clutch disk is positioned on a gear shaft of a transmission gear in an axially movable manner and the clutch disk is substantially rotationally fixedly positioned on the gear shaft. The transmission gear forms a part of the spur gear drive. The clutch disk includes a connecting arrangement located in a side thereof for generating a claw clutch engagement with a connecting arrangement formed in a side of the transmission gear. A transferring device transfers movement of the transferring device to the clutch disk along the gear shaft in order to engage and disengage the claw clutch engagement.

4 Claims, 15 Drawing Sheets (b)

DRIVE EQUIPMENT FOR OPENING AND CLOSING OF A VEHICLE TOP

BACKGROUND OF THE DISCLOSURE

The present invention relates to a drive equipment for opening and closing of a vehicle top.

DESCRIPTION OF THE PRIOR ART

In a conventional drive arrangement for foldable tops of motor vehicles which is disclosed in U.S. Pat. No. 3,116,087, an output shaft which is connected with a link mechanism to open and close a vehicle top and a motor driving shaft are interlocked via a spur gear reduction mechanism and a worm gear mechanism.

There are provided in the drive arrangement a clutch mechanism which can interrupt coupling between a worm wheel of said worm gear mechanism and said output shaft and therewith a manual opening and closing mechanism for operating said clutch mechanism on assuming an emergency or a motor trouble.

In this manual opening and closing mechanism, a entrainment member is extracted radially from concave part of the worm wheel under effect of spring as a pin is extracted manually in the direction corresponding to shaft line of said output shaft by means of an operating knob projecting outside a housing so as to promote a quick response.

However, the conventional drive arrangement for opening and closing of the vehicle top is unfavorable insofar as the pin may be missing because the pin with the operating knob is extracted from the clutch mechanism when the clutch mechanism is opened and further difficulties are encountered with the recovery of coupling of the clutch mechanism once the pin is missing.

Moreover, the conventional drive arrangement for opening and closing of the vehicle top has a disadvantage in all spur gears composing the spur gear reduction mechanism and the worm of the worm gear mechanism result in a high-speed rotation because rotation of the motor driving shaft is decelerated by means of the worm gear mechanism after the rotation is decelerated by means of the spur gear reduction mechanism and namely much abrasion and vibration of gear shaft is generated due to many high-speed stage gears.

In the link mechanism for opening and closing of the top composed of multiple links opening and closing of the vehicle top which is disclosed in drawings of U.S. patent application Ser. No. 3,116,087, a drive-side link member rotated by the driving gear and a strut member being a framework of top are coupled by a simple rivet-shaped member. The strut member is rotatably hinged in drive-side link member by the rivet-shaped member because the top vibrates and generates a noise as the strut member can displace in a longitudial direction of rivet-shaped member.

The link system for opening and closing of the top is contructed by coupling the strut member on vehicle body side where some links are coupled and the drive-side link member of the drive-arrangement side.

However, there is a problem in that an excessive force is applied as the drive-side link member is wrested when the drive-side link member is coupled with the strut member because the link member is fixedly attached to the strut member.

SUMMARY OF THE INVENTION

It is a general object of the invention to provide a drive equipment for opening and closing of a vehicle top having a clutch mechanism which enables recovering of a clutch coupling without loss of a member disengaging the clutch coupling.

It is another object of the invention to provide a drive equipment for opening and closing of a vehicle top having a reduction gear mechanism with little abrasion and vibration.

It is another object of the invention to provide a drive equipment for opening and closing of a vehicle top which enables manual opening and closing of a vehicle top without a continuous operation of an operating part of a manual opening and closing mechanism in a clutch mechanism and with a small operating force if opening and closing a top manually is necessary because of a motor trouble.

It is still another object of the invention to provide a drive equipment for opening and closing of a vehicle top having a manual opening and closing mechanism which can be operated with a screw driver and a spanner being tools which are normally provided in many vehicles.

It is another object of the invention to provide a drive equipment for opening and closing of a vehicle top wherein a top does not fall of itself even though coupling of clutch mechanism is disengaged if the manual opening and closing of a top is necessary.

It is a further object of the invention to provide a drive equipment for opening and closing of a vehicle top having a link joint wherein a coupling link and a rigid link being a strut member can be rotatably hinged without application of an excessive force when a drive-side link member fixed in the output shaft of motor and the rigid link attached in a vehicle side are coupled by the coupling link.

According to the present invention, to attain the above-stated objects, there is provided a drive equipment for opening and closing of a vehicle top for opening and closing a top comprising an opening and closing control device which decelerates a motor rotation via a worm gear, a worm wheel and a reduction gear group composed of spur gears and transmits the motor rotation to an output shaft via a clutch mechanism which can intermit transmission of the rotation by a clutch-operating member, and a pair of both-side link system which is coupled with the output shaft via a drive-side link member, characterized in that said clutch mechanism can be disengaged by thrust of clutch-operating member into the opening and closing control device and a link joint is included which enables inclining in the longitudial direction of a coupling shaft which couples said link mechanism and the drive-side link member.

To attain the above-stated objects, the drive equipment for opening and closing of the vehicle top is also characterized in that a clutch disk generating a claw clutch operation with the transmission gear is inserted into a transmission gear shaft supporting rotatably the transmission gear engaging between the reduction gear group composed of said spur gears in an axially displaceable manner and a clutch operating member disengaging said claw clutch operation in connection with the clutch disk can be operated by thrust inward the opening and closing control device.

To attain object of the present invention, the drive equipment for opening and closing of the vehicle top is also characterized in that the transmission gear engaging between the reduction gear group is rotatably inserted into the transmission gear shaft, and a clutch disk forming a connecting concave part generating a claw clutch operation with a connecting pawl formed in an end of the transmission gear under effect of spring is inserted in an axially displaceable manner without a free-rotation, and the clutch-disengaging member disengaging a claw clutch operation in connection with said clutch disk can be thrusted into a housing by interlocking with rotation operation of an operating bolt projecting outside the housing of said opening control device.

According to this construction, screwing an operating bolt with a screw driver or a spanner being a tool which is normally provided in a vehicle enables normal disengagement of clutch mechanism at the desire.

According to the aforesaid means of the invention, as the operating bolt projecting outside the housing is screwed into the housing, the claw clutch between the intermediate gear and the transmission gear engaging with the intermediate gear turning with the worm wheel is disengaged and the disengaging state is held because a disengaging member which can interlock with said bolt is connected with the clutch disk inserted into the transmission gear shaft in an axially displaceable manner without a free-rotation under effect of springs and the clutch disk displaces on the transmission gear shaft via the disengaging member, pressing springs in the direction corresponding to clutch disengagement. As a result thereof, because the coupling of motor driving shaft and output shaft via a worm gear mechanism is kept interrupted and the reversing preventive action is not taken from the worm wheel in the worm gear mechanism, a top can be manually opened and closed. Thrusting directly the disengaging member by a hand enables disengagement of clutch in emergency.

To attain objects of the invention the drive equipment for opening and closing of the vehicle top is also characterized in that the clutch disc generating claw clutch operation with a trapezoidly-shaped connecting tooth formed in the end of the transmission gear engaging between said reduction gear group is supported in the transmission gear shaft in an axially-displaceable manner without a free-rotation, and a spring-force adjusting member adjusting the spring force of an pushing spring acting on said clutch disc by means of an axial displacement is supported in said transmission gear shaft, and the adjusting member can be thrusted into the housing by interlocking with rotation operation of an operating screw projecting outside the housing of said opening and closing control device.

According to this construction, when the operating bolt projecting outside the housing is screwed into the housing, the spring-force adjusting member interlocking therewith displaces on the transmission gear shaft and lengthen the pushing spring by widening the space between the clutch disk and the adjusting member, thereby the spring force acting on the clutch disk and a tenacity of the claw clutch are weakened so far as the weight of top can be supported and the clutch can be manually disengaged. At this moment, if the link system is manually swung, the operating force for opening and closing of the top is transmitted through the output shaft and the transmission gear shaft to the clutch disk as a rotating force, because said disk can be displaced in an axial direction thereof against a weakened spring force of the pressing spring and the disk can rise across the trapezoidly-shaped connecting tooth which generates claw clutch operation therewith, whenever said connecting tooth is ridden across, the clutch operation is discontinuously disengaged, so that the top can be manually opened and closed. Also, the top is not fallen by the weight thereof because the clutch operation is not disengaged unless the link system is manually inclined.

To attain objects of the invention the drive equipment for opening and closing of the vehicle top is also characterized in that in said opening and closing control device, the worm gear is connected to a driving shaft and a worm wheel is engaged with the worm gear and an intermediate spur gear turning with the worm wheel is engaged with the transmission gear and a pinion is formed in the transmission gear shaft supporting said transmission gear and a rotation shaft of reduction spur gear engaging with the pinion is an output shaft.

According to this construction, the high-speed rotation part is decreased and abrasion and vibration is reduced because the motor rotation number is much decreased first, then is transmitted to the transmission gear, the intermediate spur gear and the reduction spur gear via engagement between the worm gear and the worm wheel.

To attain objects of the invention, the drive equipment for opening and closing of the vehicle top is also characterized in that said link joint has a coupling link having a boss whose inner hole is a curved-face, and both sides of said coupling link are sandwiched by washer members having tapers with bigger aperture for the outside, and the coupling link is rotatably coupled with said drive-side link member by means of an coupling shaft.

According to this construction, the drive-side link member can be coupled with the vehicle-side link mechanism without application of an excessive force to the drive-side link member because the coupling link rod can be inclined.

Other and further objects, features and advantages of the invention will become appear more fully from the following description.

BRIEF DESCRIPTION OF THE DRAWINGS

FIG. 1 is an outline side-view illustrating the whole of a drive equipment for opening and closing of a vehicle top of the first embodiment.

FIG. 2 is a plan view of the opening and closing control device.

FIG. 3 is a view taken on line B—B of FIG. 2.

FIG. 4 is a partial cutaway front view illustrating the connecting state between a clutch disk 30 and a clutch-disengaging member 37.

FIGS. 5 and 6 are section views of main part illustrating operation of the opening and closing control device of the present embodiment.

FIG. 7 is a plan view illustrating the main part of the opening and closing control device.

FIG. 8 is a cross-sectional view cut on line B—B of FIG. 7.

FIG. 9 is an exploded perspective view illustrating the main part of the opening and closing control device.

FIG. 10 is a partial cutaway front view illustrating the connecting state between an interlocking member 40 and a spring-force adjusting member 61 in the opening and closing control device.

FIG. 11 is a section view of the main part illustrating operation of the opening and closing control device of the present invention.

FIG. 12 is an explanatory view illustrating operation of a claw clutch mechanism.

FIG. 14(a) is a sectional view illustrating the swinging arm side in the link rod.

FIG. 14(b) is a sectional view illustrating the side of a falling pillar of the coupling link rod.

DETAILED DESCRIPTION OF THE PREFERRED EMBODIMENTS

(First Embodiment)

Referring now to the accompanying drawings, a first embodiment of the invention will be described.

Figure 1:
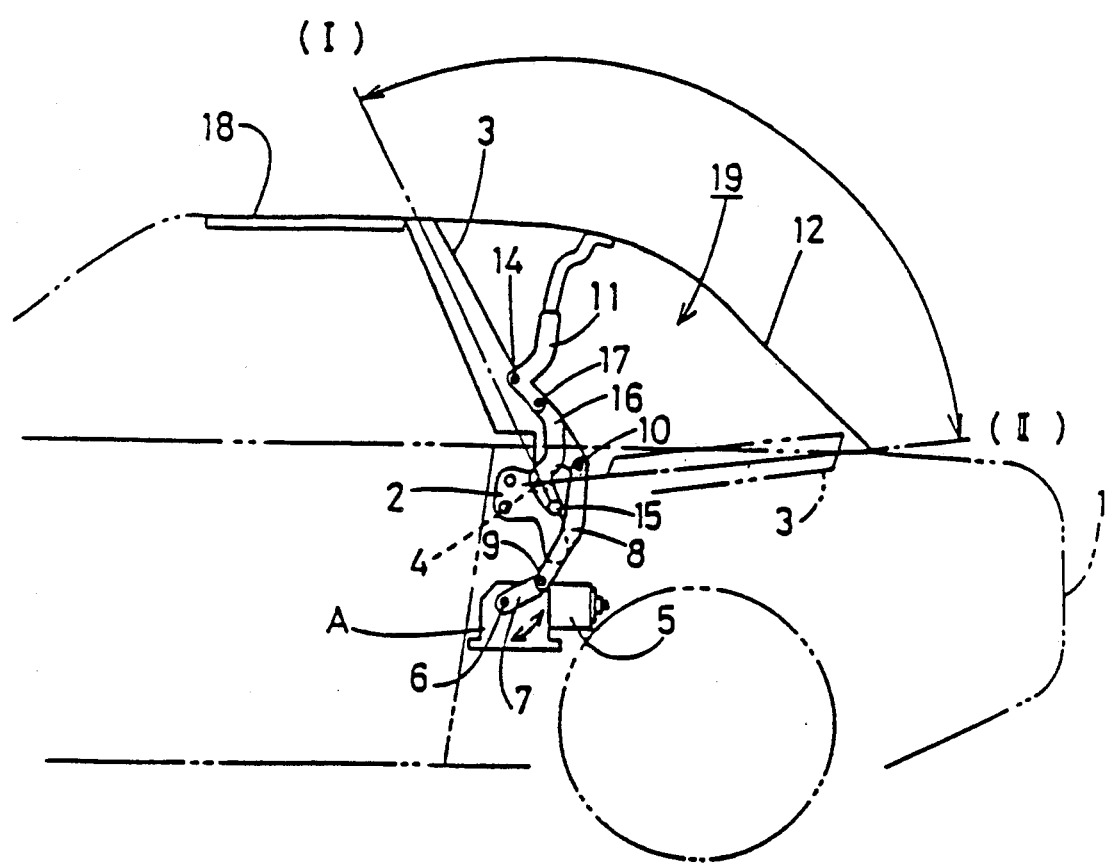
FIGS. 1 to 6 show the first embodiment of the present invention.

FIG. 1 is a side-view illustrating a synopsis of a drive arrangement for opening and closing of a vehicle top according to the first embodiment. A hinge bracket 2 is fixed in the side of a vehicle 1. An end of a falling pillar 3 is swingably supported in the bracket 2 by a hinge 4. The falling pillar 3 and a swinging arm 7 which is fixed in an output shaft 6 of an opening and closing control device "a" installed in the vehicle 1 are coupled by a coupling link rod 8 with hinging bolts 9, 10. Numeral 11 designates a forming bar, which forms a top 12 closing between positions of the falling pillar 3 and a rear of vehicle 1 in the illustration. The forming bar 11 is swingably supported in the falling pillar 3 by a hinge 14 and coupled by a hinge 17 with a link rod 16 supported by a hinge 15 in said hinge bracket 2. A hard roof 18 is detachably attached to the falling pillar 3.

When the swinging arm 7 is swung by means of an output shaft 6 of the opening and closing control device "a" having a motor 5 whose clockwise/counterclockwise rotation is controlled, a top 12 is automatically opened and closed via a link mechanism 19 comprising the link rods 8 and 16, the forming bar 11 and the like as the falling pillar 3 swings between closed position (I) and opened position (II).

Figure 2:
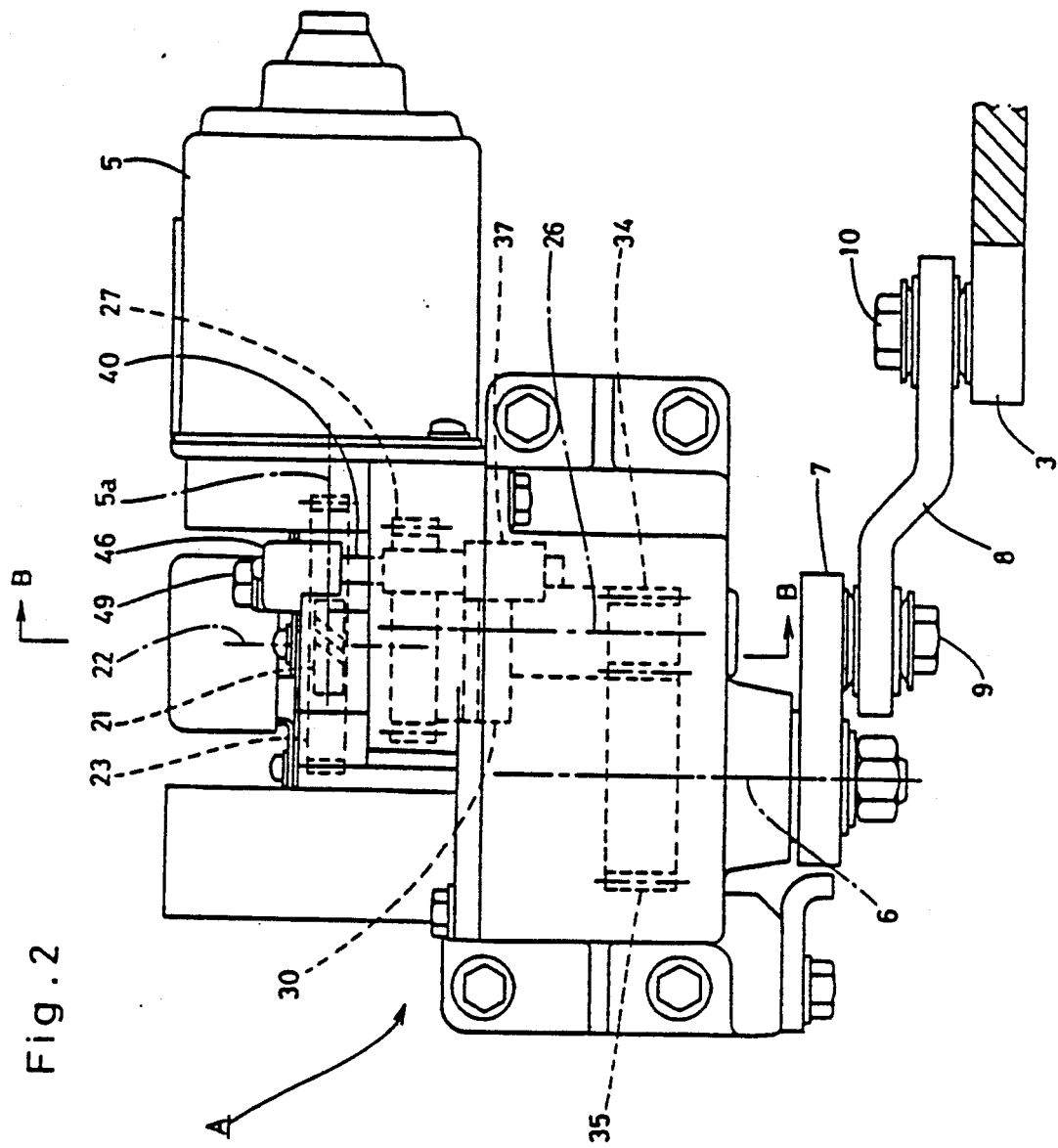
Figure 3:
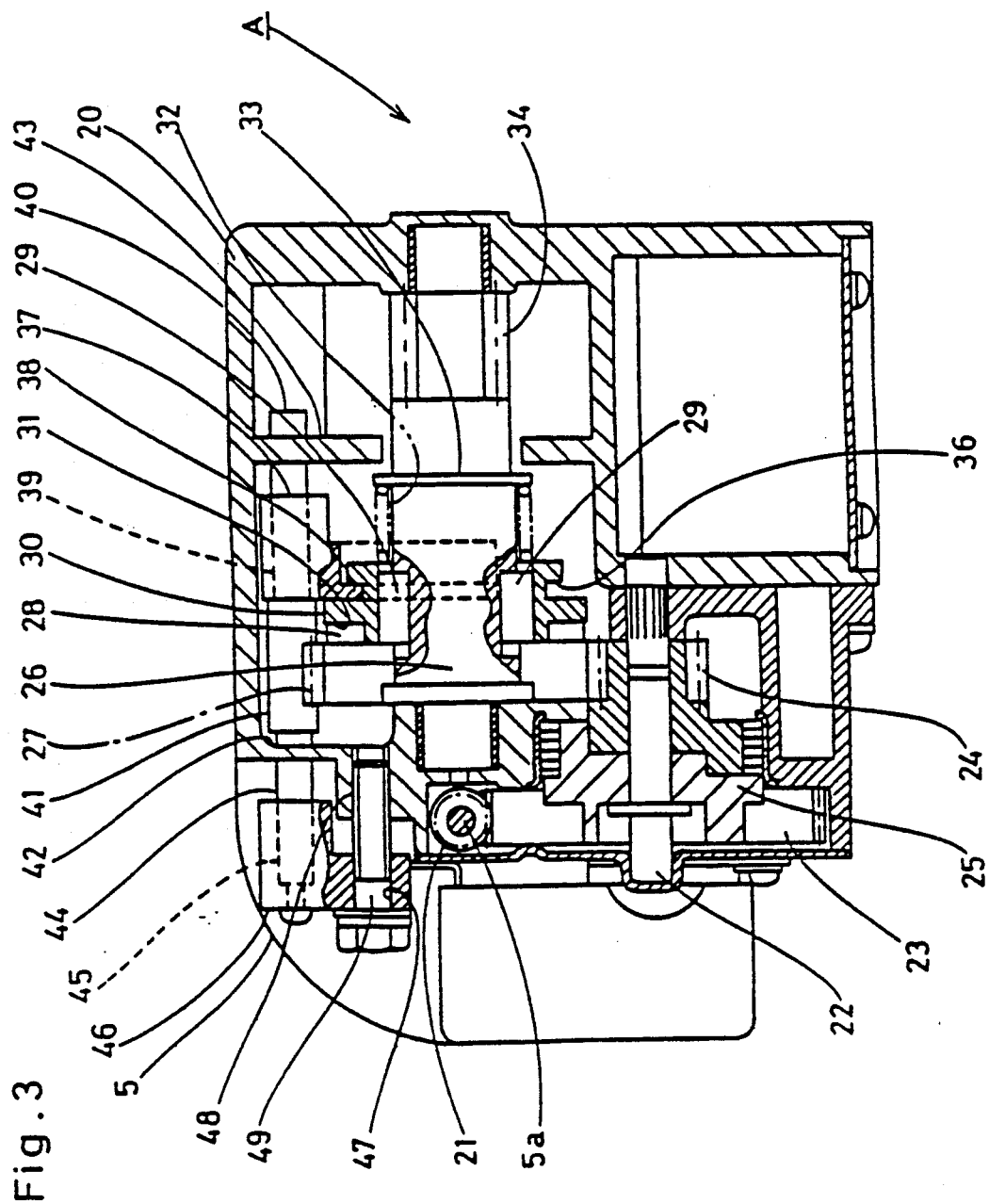

In FIGS. 2 and 3, letter "a" designates the aforesaid opening and closing control device, and said motor 5 is attached thereto. A worm gear 21 of the driving shaft 5a of the motor 5 is meshingly engaged with a worm wheel 23 inserted into a worm wheel shaft 22. The worm wheel 23 and the worm gear 21 define a first reduction gear stage formed as a worm drive. An intermediate gear 24 is also inserted into the worm wheel shaft 22. The intermediate gear 24 and the worm wheel 23 are coupled by a coupling member 25 and they are together rotated. Numeral 26 designates a transmission gear shaft, whose both ends are rotatably supported in the housing 20 of said opening and closing control device "A". A transmission gear 27 engaging with the intermediate gear 24 is rotatably inserted into one side of the transmission gear shaft 26. The transmission gear 27 forms a connecting pawl 28 projectively in the side at the interval of equal angles. A connecting concave part 31 is formed in the side of a clutch disk 30 inserted into said transmission gear shaft 26 via a key 29 in an axially displaceable manner without a free rotation (i.e., the clutch disk 30 is substantially rotationally fixedly positioned on the gear shaft 26), and a claw clutch operation is generated in connection with the connecting concave part 31 and said connecting pawl 28. Numeral 32 designates a spring attached between the clutch disk 30 and a retaining ring 33 fixed in the transmission gear shaft 26. The force of said spring 32 is operated in the direction corresponding to claw clutch operation. Numeral 34 designates a pinion inserted into the other side of said transmission gear shaft 26. The pinion 34 is engaged with a reduction gear 35 fixed in the output shaft 6. The transmission gear 27, the intermediate gear 24, the pinion 34 and the reduction gear 35 define a second reduction gear stage formed as a spur gear drive.

Figure 4:
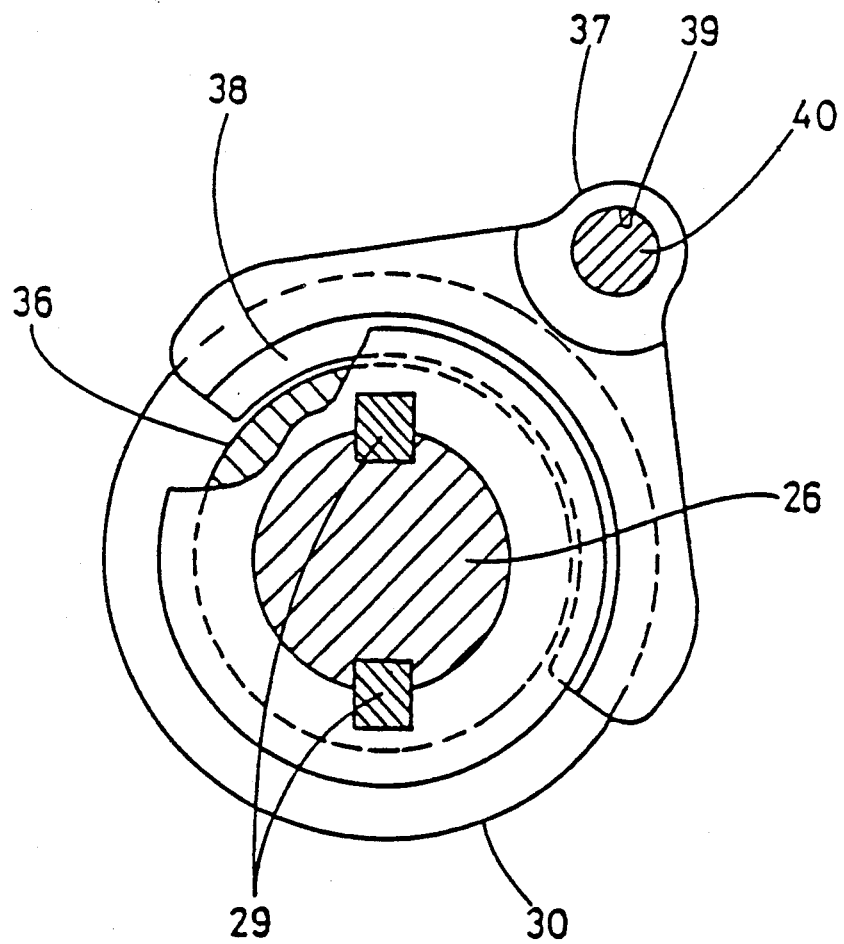

In FIG. 4, numeral 37 designates a clutch-disengaging member forming a semi-circular connecting convex part 38 inserted into a connecting annular groove 36 formed in the clutch disk 30. The clutch-disengaging member 37 is displaceably spanned within the housing 20 with an operating shaft 40 fixedly inserted into a shaft-inserting part 39 thereof. As shown in FIG. 3, an enlarge part 41 is formed in the operating shaft 40. An axial displacement of the operating shaft 40 is limited between an inner wall 42 and an intermediate wall 43 of the housing 20. A projecting part 44 which projects from the housing 20 is formed in the operating shaft 40. An interlocking member 46 is fixed in the end 45 of the projecting part 44. An operating-bolt inserting hole 47 is formed in the interlocking member 46. An operating bolt 49 is screwed into a screw hole 48 formed in the housing 20 and is inserted through the operating-bolt inserting hole 47.

In the present embodiment, the above-mentioned opening and closing control device "A" is provided in pairs in both sides of vehicle. A swinging angle for the falling pillar 3 which swings between a top-closed position (I) and a top-opened position (II) and a rotation of motors provided in both sides are controlled by a limit switch, an encorder, a stopper and the like, but because they are beyond the subject matter the explanation is abbreviated.

Figure 5:
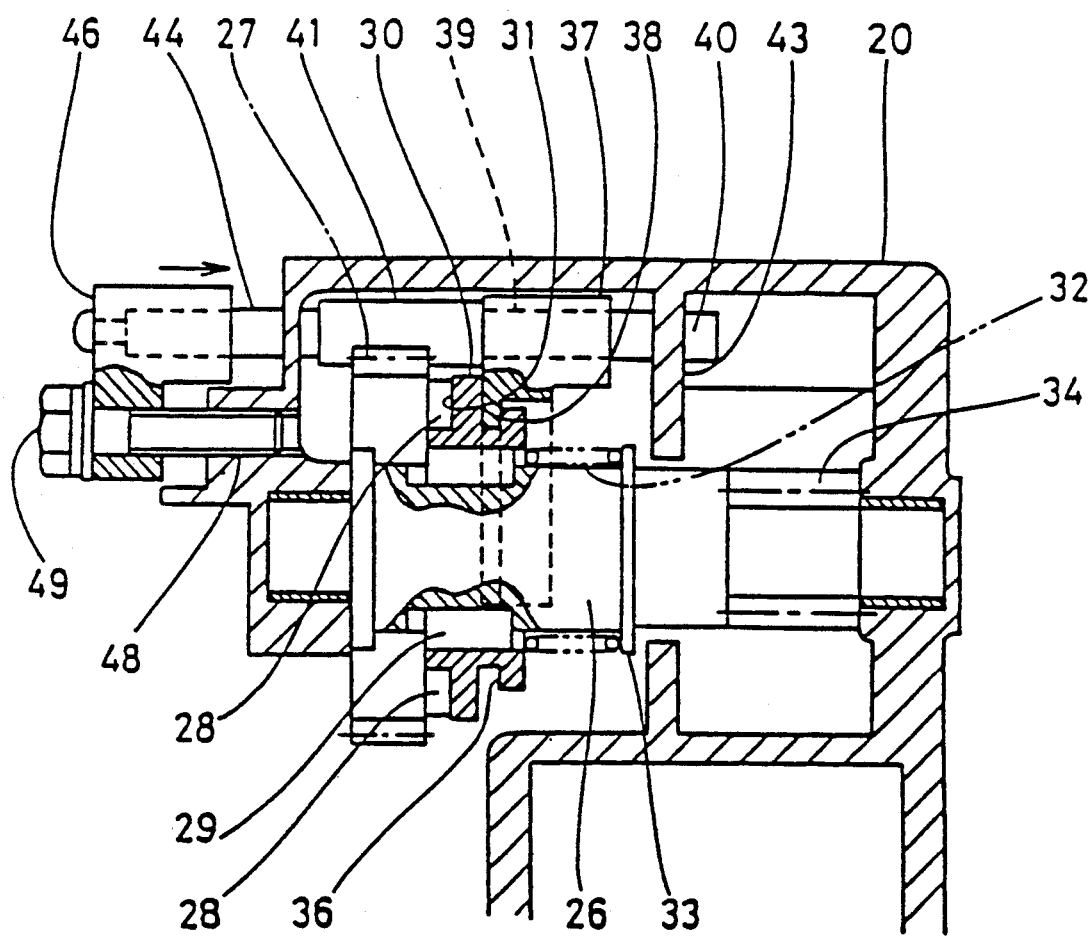
Figure 6:
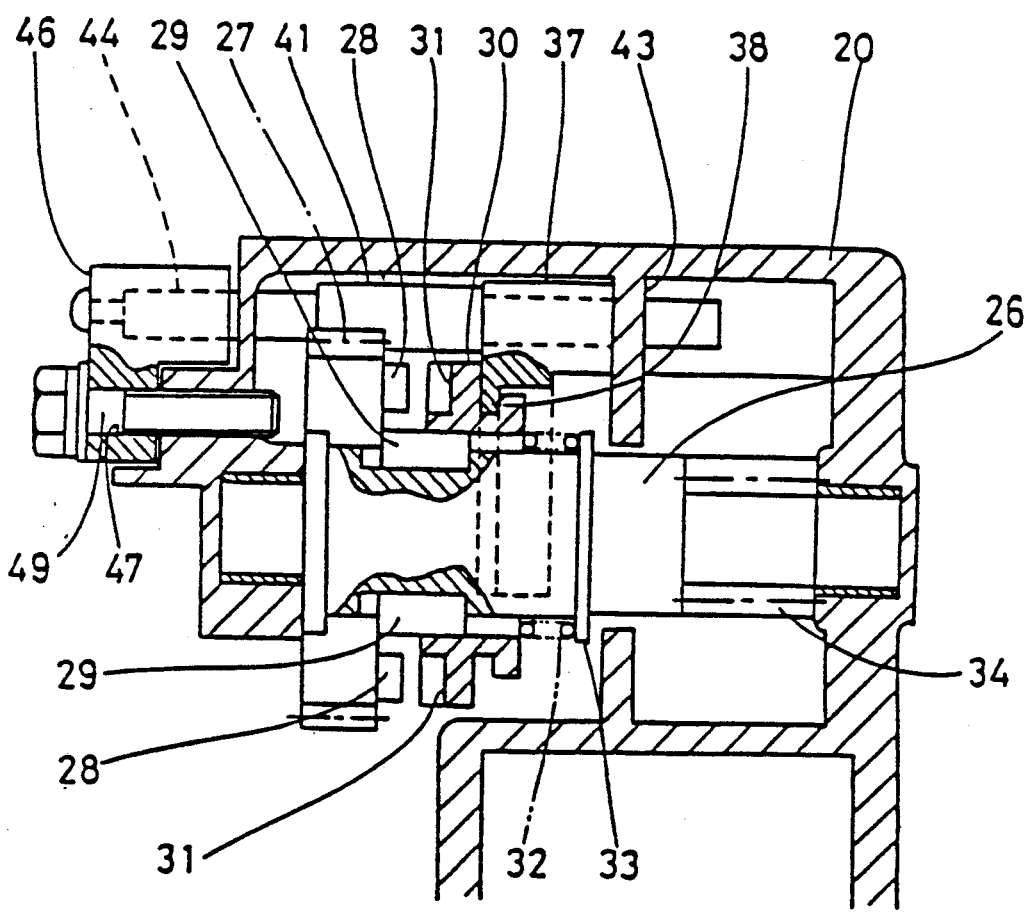

As the present invention has been explained above, if the manual opening and closing of a top is necessary such as in an emergency, as the interlocking member 46 fixed in the end 45 of the projecting part 44 of the operating shaft 40 is thrusted toward the housing 20 by hand, the clutch-disengaging member 37 is displaced in the direction corresponding to an arrow in FIG. 5 by a stage of the enlarge part 41 and the clutch disk 30 is displaced against the spring force of the spring 32 because the connecting convex part 38 of the clutch-disengaging member 37 has been inserted into the connecting annular groove 36 and the engagement between the connecting pawl 28 of the transmission gear 27 and the clutch disk 30 is disengaged, so the claw clutch connection is disengaged. In this case, the clutch disk 30 is returned under effect of the spring force of the spring 32 and the clutch connection is recovered when the pushing pressure is not applied to the interlocking member 46.

If the top is manually opened and closed owing to a trouble of motor 5, as the operating bolt 49 is screwed into the screw hole 48 with a spanner and a screw driver, the head of the operating bolt 49 pushes the interlocking member 46, and the clutch-disengaging member 37 and the clutch disk 30 are displaced. This results in disengaging the claw clutch connection. In this case, the disengaging state of claw clutch is maintained because the operating bolt 49 is screwed into the screw hole 48. It can be seen, therefore, that the bolt 49, the interlocking member 46, the operating shaft 40 and the clutch-disengaging member 37 define a transferring means for transferring movement thereof into movement of the clutch disk 30 in order to disengage and engage the claw clutch engagement.

The top can be manually opened and closed because a coupling between the worm gear 21 of the motor driving shaft 5a and the output shaft 6 is disengaged and there is no reversing prevention action from the worm wheel 23 and of the worm gear 21 when the claw clutch is disengaged.

(Second Embodiment)

In accordance with the FIGS. 7 to 12 the second embodiment of the present invention is hereinafter described.

FIG. 1 shows an abstract of the drive equipment for opening and closing of a motor vehicle of the second embodiment being the same with the first embodiment. A hinge bracket 2 is fixed in a side of a vehicle 1, an end of a falling pillar 3 is swingably supported thereon by a hinge 4, and a swinging arm 7 which is fixed in an output shaft 6 in an opening and closing control device A installed in the vehicle 1, and the falling pillar 3 are coupled by a coupling link rod 8 via hinging bolts 9, 10. Numeral 11 shows a forming bar for forming a vehicle top 12 which closes between positions the falling pillar 3 and a rear of the vehicle 1, said bar 11 is swingably supported by the falling pillar 3 via a hinge 14, and is coupled by a hinge 17 with a link rod 16 which is supported by a hinge 15 in said hinge bracket 2. A hard roof 18 is detachably fitted in the falling pillar 3. If the swinging arm 7 is swung by an output shaft 6 in the opening and closing control device "A" having a motor 5 whose clockwise/counterclockwise rotation is controlled, the falling pillar 3 automatically opens and closes the vehicle top 12 by swinging between a closing position (I) and an opening position (II) by means of a link mechanism 19 consisted of the link rods 8, 16 and the forming bar 11.

Figure 7:
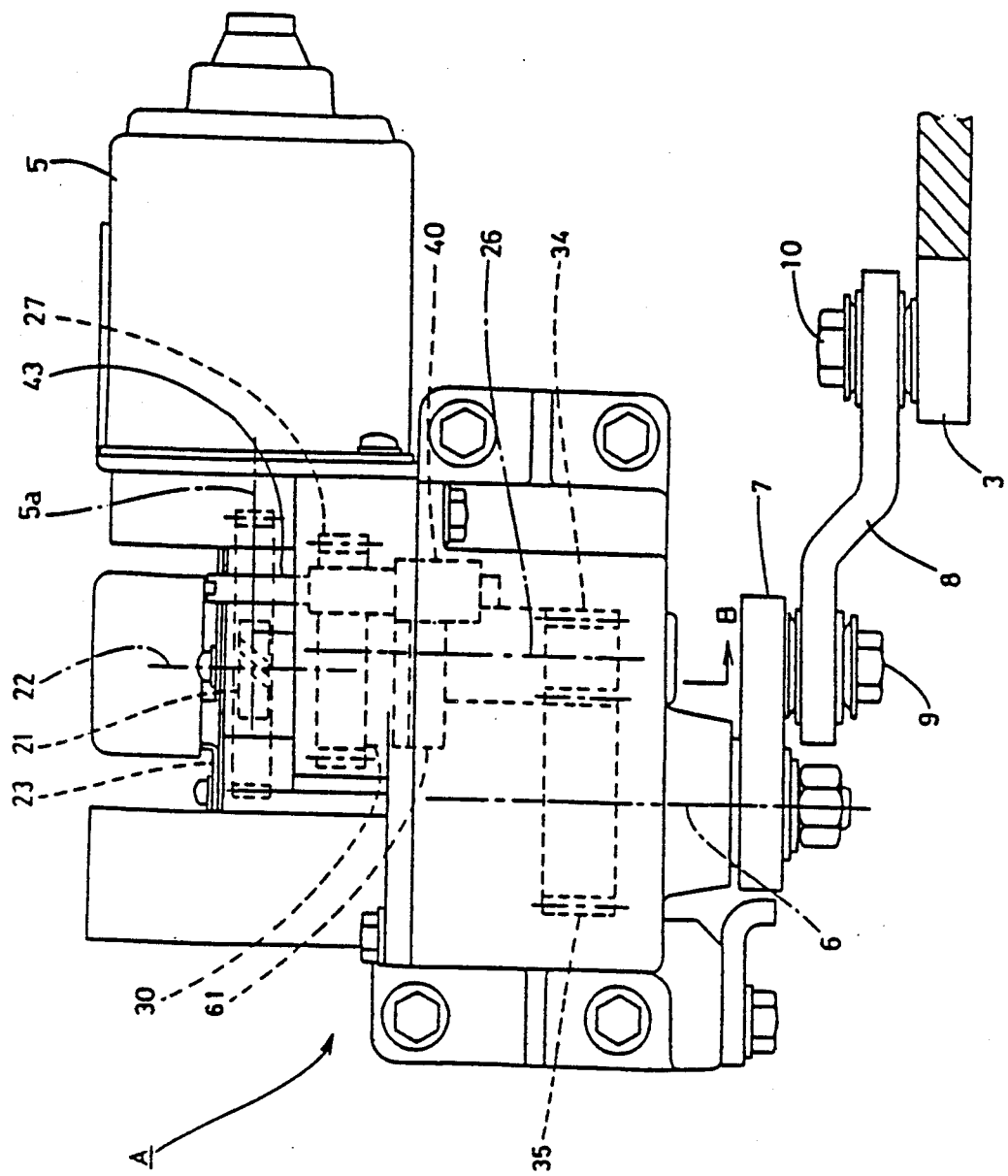
FIGS. 7 to 12 illustrate the second embodiment of the present invention.
Figure 8:
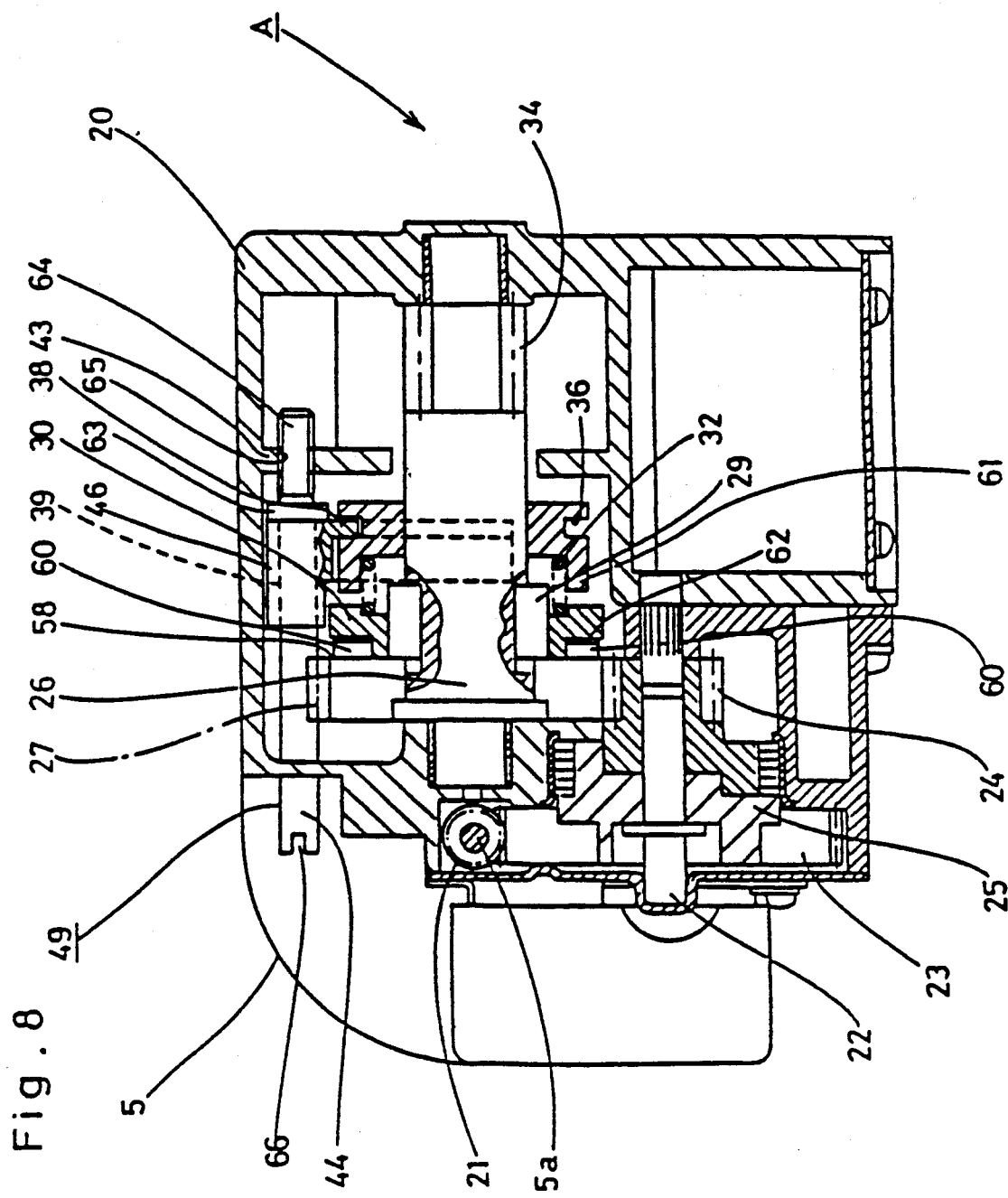
Figure 9:
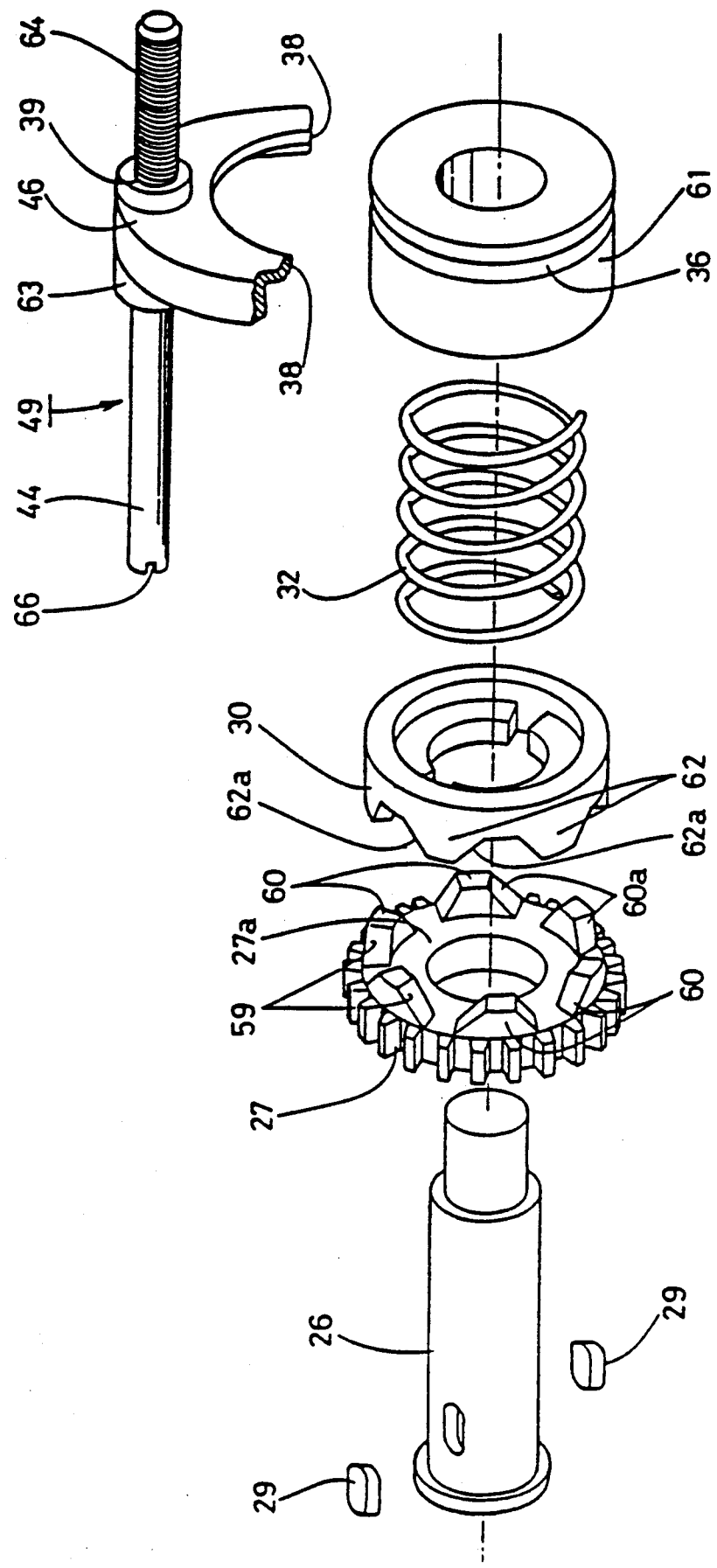
Figure 10:
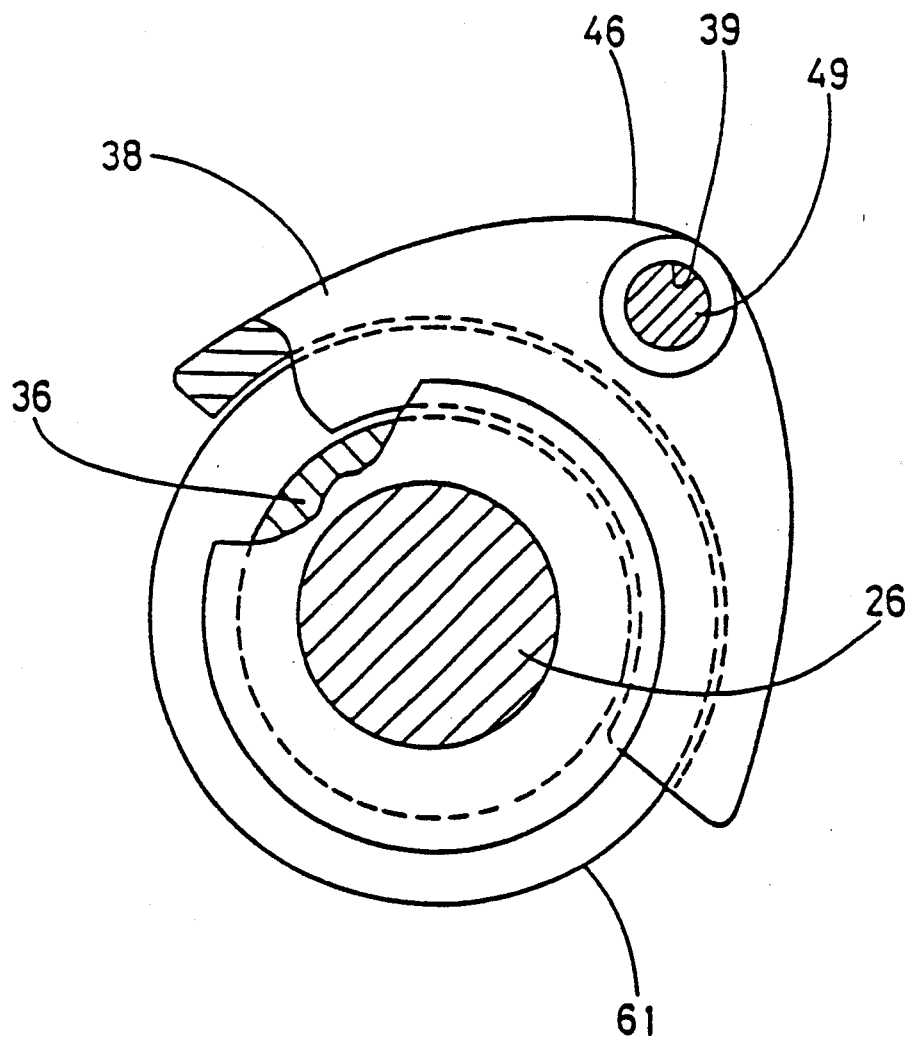

In FIGS. 7 and 8 the letter "A" illustrates the above-mentioned opening and closing control device. The motor 5 is fitted therein, and a worm gear 21 in a driving shaft 5a thereof is engaged with a worm wheel 23 inserted into a worm wheel shaft 22. An intermediate gear 24 is rigidly inserted into the worm wheel shaft 22, and coupled with the worm wheel 23 by a coupling member 25, in a rotatable manner with the worm wheel 23. Numeral 26 shows a transmission gear shaft whose both ends are rotatably supported to a housing 20 in the opening and closing control device "A" and a transmission gear 27 engaging with the intermediate gear 24 is rotatably inserted on a side end thereof. As illustrated in FIG. 9 in a side face 27a of the transmission gear 27 is continually formed a trapezoidly-shaped connecting tooth 60 which has narrowed tips by inclining both-sides of each connecting face 60a on the circumference thereof. Numeral 30 shows a clutch disk supported by the transmission gear shaft 26 in an axially-displaceable manner without the free-rotation by means of the key 29. In the clutch disk 30 is continousllly formed a trapezoidly-shaped connecting tooth 62 which has connecting faces 62a narrowed in a direction corresponding to a tooth tip on a circumference of a side face thereof corresponding to the transmission gear 27, so as to generate a claw clutch connection with the trapezoidly-shaped connecting tooth 60 of the transmission gear 27. Numeral 32 shows a pressing spring which is arranged between the clutch disk 30 and a spring-force adjusting member 61 of which the spring force is applied in a connecting direction corresponding to the claw clutch. The spring-force adjusting member 61 is rotatably inserted into the transmission gear shaft 26 in an axially displaceable manner, and is formed a connecting annular groove 36 in an outside circumference thereof. Numeral 34 shows a pinion fixedly inserted into the other end of the transmission gear shaft 26, which is meshingly engaged with a speed-reduction gear 35 fixed on an output shaft 6 as illustrated in FIG. 7. Numeral 46 shows an interlocking member which is semi-circularly formed with a connecting convex part 38 to be inserted into the connecting annular groove 36 formed in the outside circumference of the spring-force adjusting member 61 and the interlocking member 46 is spanned within the housing 20 by an operating 49 inserted into a shaft-inserting part 39. A collar 63 is formed in the operating screw 49 so that the spring force of the pressing spring 32 abuts with the interlocking member 46 on which the spring force of the pressing spring 32 acts via the spring-force adjusting member 61, and a screw portion of the operating bolt 49 is screwed into a screw hole 65 formed in an intermediate wall 43 in the housing 20 as illustrated in FIG. 8. In the operating bolt 49, a groove-shaped operating part 66 is formed at a projecting part 44 which projects outside the housing 20.

In the present embodiment, the above-mentioned opening and closing control device "A" is disposed in pairs in both sides of the vehicle the swinging angle of the swinging arm 7 for swinging the falling pillar 3 between the top-closed position (I) and the top-opened position (II) and the rotation of the motor 5 disposed in both sides are controlled by a limit switch, an encorder and a stopper etc. However, because they are beyond the subject matter of the invention, a further detailed explanation thereof is abbreviated.

Actuation of the Second Embodiment

Figure 11:
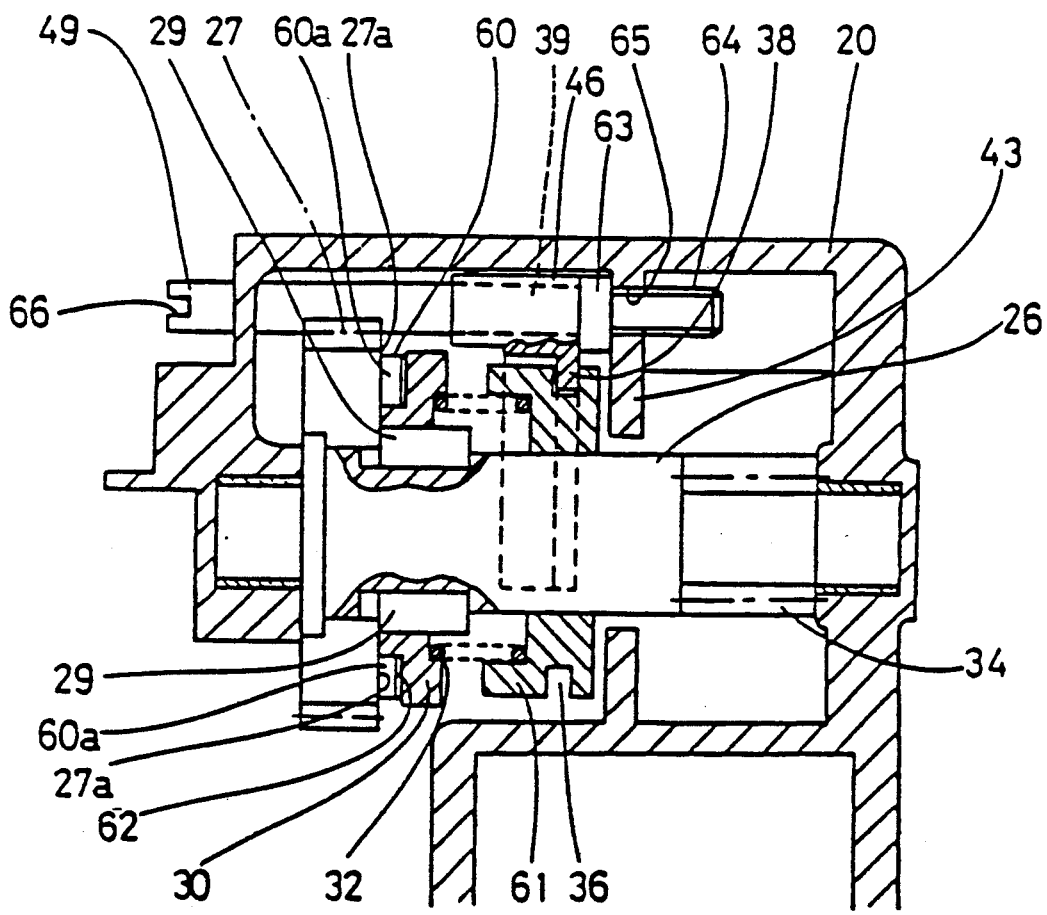
Figure 12:
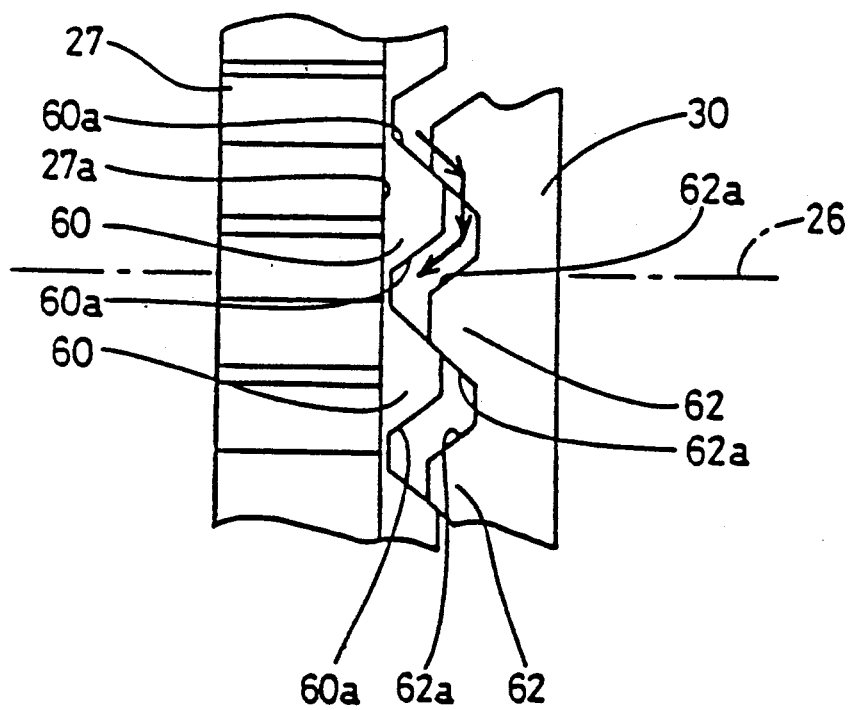
Figure 13:
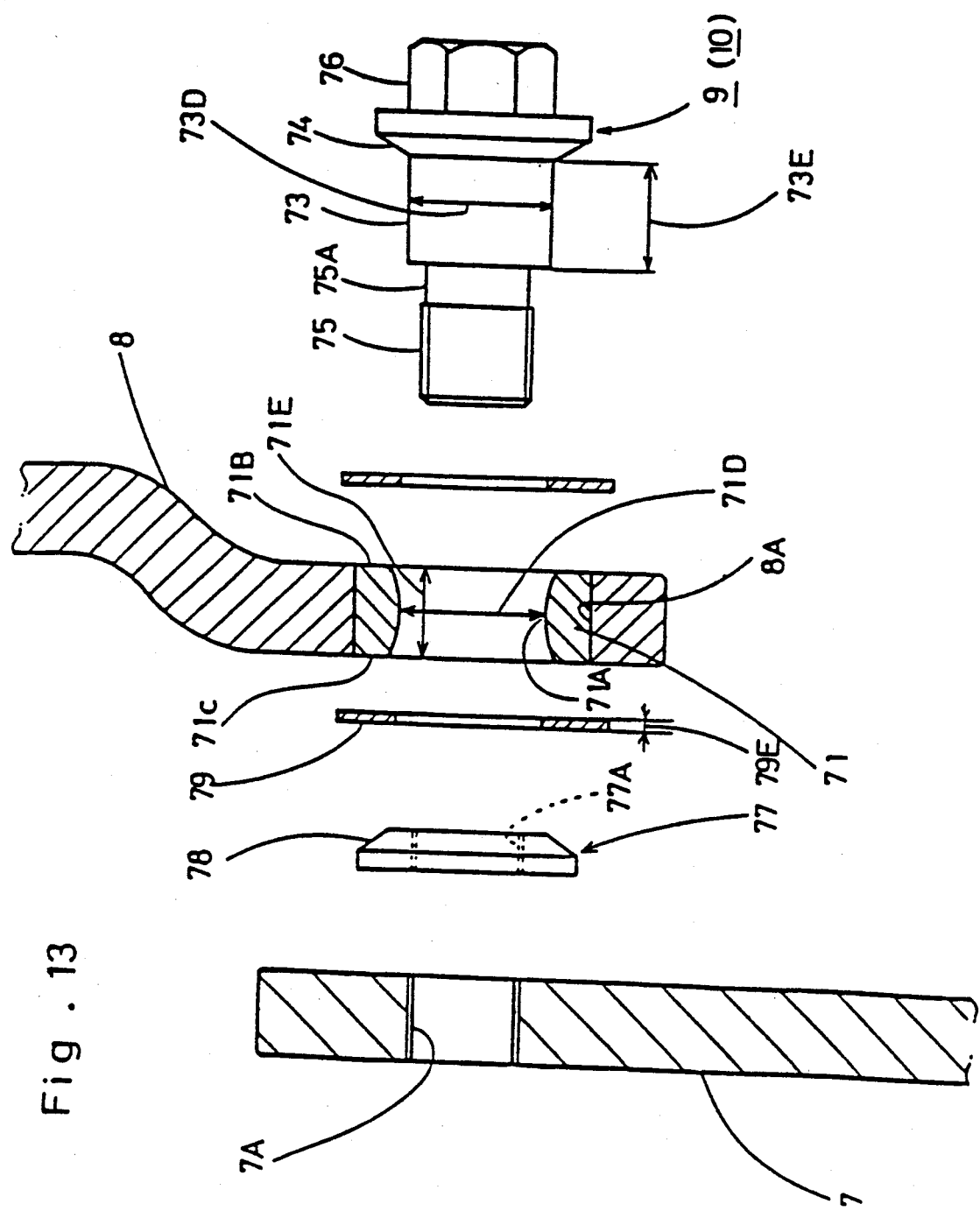
FIG. 13 is a sectional view illustrating the third embodiment of the present invention.

As the present embodiment has the construction described above, if the manual opening and closing of the top is necessary for the trouble of the motor 5, the operating part 66 of operating bolt 49 which is illustrated in FIG. 11 should be screwed into the screw hole 65 with a screw driver. The interlocking member 46 abutted to the collar 63 thereof is displaced and the spring-force adjusting member 61 whose connecting annular groove 36 has been connected to the semi-circular connecting projecting part 38 of said interlocking member 46, is displaced on the transmission gear shaft 26, due to the spring-force connection of the pressing spring 32. Therefore the space between the spring-force adjusting member 61 and the clutch disk 30 is widened, and the spring force acting on the clutch disk 30 is weakened by lengthening of the pressing spring 32.

Thereby, the tenacity of clutch connection becomes weak as far as the falling of top 12 is prevented and the manual opening and closing of top 12 is possible. At this stage, if the top 12 or the link mechanism 19 supporting the top is manually swung, then the clockwise/counterclockwise rotary force is transmitted in the following order to the output shaft 6, the speed-reduction gear 35, the pinion 34, the transmission gear shaft 26 and the clutch disk 30. However the transmission gear 27 cannot be rotated by the clutch disk 30 thereby preventing reversal of the operation. Because the connecting face 62a of the trapezoidly-shaped connecting tooth of the clutch disk 30 has been engaged with the connecting face 60a of the trapezoidly-shaped connecting tooth 60 of the transmission gear 27, the clutch disk 30 is displaced by a rotating force of itself on the axial direction against the spring force, so that said connecting face 62a can ride across said trapezoidly-shaped connecting tooth 60, whether the direction of the rotation is clockwise and counterclockwise. Therefore the manual opening and closing of the top will be enabled, whenever the claw clutch connection is discontinuously disengaged and the connecting face 62a rides across the connecting tooth 60, as illustrated by an arrow in the FIG. 12. Thereafter, if the operation screw 49 is unscrewed, the interlocking means 46 abutting on the collar 63 thereof moves the spring-force adjusting member 61, and the adjusting member is made to approach the clutch disk 30, therefore the spring force of the pressing spring 32 has powerfully acted on the clutch disk 30, and the claw clutch connection thereof will be rigidly maintained. Because an axial displacement of the clutch disk 30 has also limited by the approaching of the spring-force adjusting member 61 theretofor, and a connection between the trapezoidly-shaped connecting teeth 60 and 62 has powerfully engaged, the claw clutch connection thereof has come to hold, and the top cannot be manually opened and closed but by the motor 5. It can be seen from the foregoing description, therefore, that the operation screw 49 and the interlocking member 46 define a transferring means for transferring movement thereof into movement of the clutch disk 30 in order to disengage and engage the claw clutch engagement.

Third Embodiment

Referring now to FIG. 1, FIG. 13, FIG. 14(a) and FIG. 14(b), the third embodiment of the invention will be described.

According to the third embodiment, each link joint which connects the link rod 8 with the swinging arm 7 and the falling pillar 3 is composed chiefly of a bush 71, hinging bolts 9, 10 being coupling shafts, a washer 77, and packings 79. An inserting hole 8A which inserts rigidly the bush 71 to form a boss is provided in both ends of a coupling link rod 8. The bush 71 is inserted into said inserting hole 8A. Said bush 71 is fixedly caulked by the link rod 8. The bush 71 is carburized and cementated after grinded. An inner hole 71A in the bush 71 forms a curved face toward the center from the both sides 71B, 71C. The hinging bolts 9 and 10 have a parallel part 73, a taper 74, a screw part 75 and a hexagonal top 76. The parallel part 73 has an outer diameter 73D being about the size of a minimum inner diameter 71D of the inner hole 71A of bush 71 and a length 73E equaling that of a doubled thickness 79E of packing 79 added to the thickness 71E of bush 71 to prevent the link rod 8 from jolting in the longitudinal direction of link rod 8. The taper 74 forms a smoothed face of diameter being bigger toward the head 76 from the parallel part 73. It does not matter if the collar-shaped part where the taper 74 is formed becomes a washer which is independant from the hinging bolts 9 and 10. A washer-placed groove 75A with a smaller diameter is provided between the parallel part 74 and the screw part 75 so as to place the washer 77. The washer 77 sandwiching the bush 71 with the taper 74 has a inserting hole 77A providing a screw which is incompletely screwed in the outer diameter of screw 75 of hinging bolts 9 and 10 and the taper 78 thereof has a continuously bigger diameter from the contact side with the packing 79. The washer 77 is screwed in the hinging bolts 9 and 10 and provided in the washer-placed groove 75A. Thus, the washer 77 is not easily disconnected with each screw part 75 of the hinging bolts 9 and 10. The packing 79 is a packing for smoothing rotation of the link rod 8 and preventing a contact between metals. Oil is soaked in the packing 79 composed of a felt etc. The packings 79 are provided at both sides of bush 71 in the both ends of the link rod 8, and the hinging bolts 9 and 10 are inserted into the packings 79 and the taper 78 of the washer 77 is directed to the link rod 8, and the link rod 8 is sandwiched between the washer 77 inserted into the hinging bolts 9 and 10 and the taper 74 of the hinging bolts 9 and 10 via the packing 29. The link rod 8 is coupled with a swinging arm 7 and the falling pillar 3 as a screw locking medicine is applied to the screw part 75 of the hinging bolts and 10 more inserted into each end of the link rod 8 and the hinging bolts 9 is screwed into the screw holes 7A and 3A of the swinging arm 7 and the falling pillar 3 respectively. The link rod 8 enables inclining movement of hinging bolts 9 and 10 in the longitudial direction corresponding to the swinging arm 7 and is rotatably hinged because the inner holes 71A of bushes 71 are the smoothly curved face and the tapers 74 and 78 have been provided in the hinging bolts 9, 10 and the washer 77.

As illustrated in FIG. 1 showing the first embodiment, each link mechanism 19 is a mechanism for opening and closing a falling pillar 3 by means of each motor 5 placed in the vehicle side. Each opening and closing control device "A" including a clutch and gear trains is connected to the motor 5. The swinging arm 7 is fixed in the output shaft 6 of said control device "A". Said swinging arm 7 is rotated by the output shaft 6 causing the actuation of the motor 5. The link rod 8 is hinged in a inclinable and rotatable manner by the link joint of the present embodiment in the other side of the swinging arm 7. The falling pillar 3 installed in a vehicle side is a framework supporting the top 12, and forms a U-reversing shape to couple both sides in a vehicle, forming a roof part. Each forming bar 11 is rotatably hinged in the falling pillar 3 by a hinging pin 14 to support the top 12-spread state when the top 12 is closed. A link rod 16 is connected with in the forming bar 11 by a hinging pin 17. Numeral 2 designates a hinge bracket fixed in the vehicle side and wherein the falling pillar 3 and the link rod 16 are rotatably hinged and supported by means of the hinging pins 4 and 15 respectively.

Figure 14:
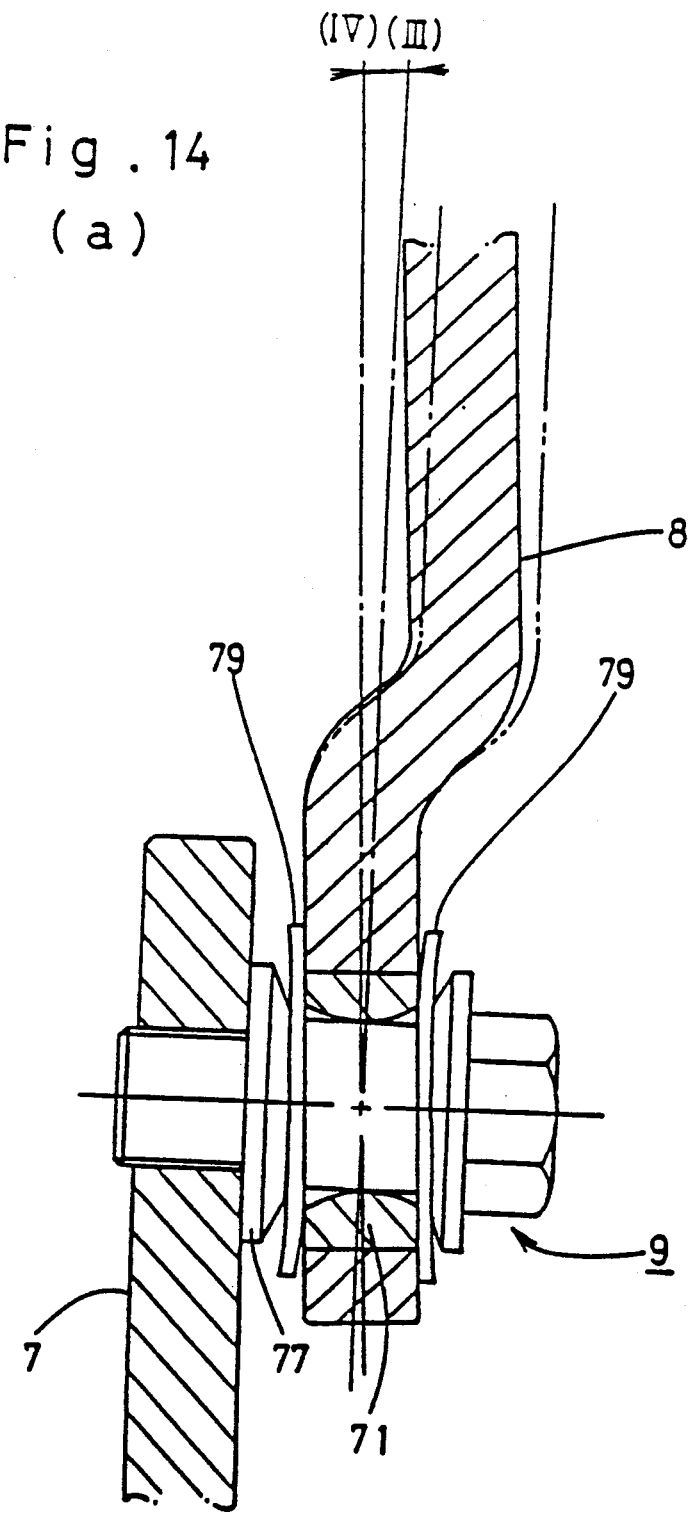
FIG. 14(a) and FIG. 14(b) illustrate inclining movement of a coupling link rod relative to the third embodiment.
Figure 14:
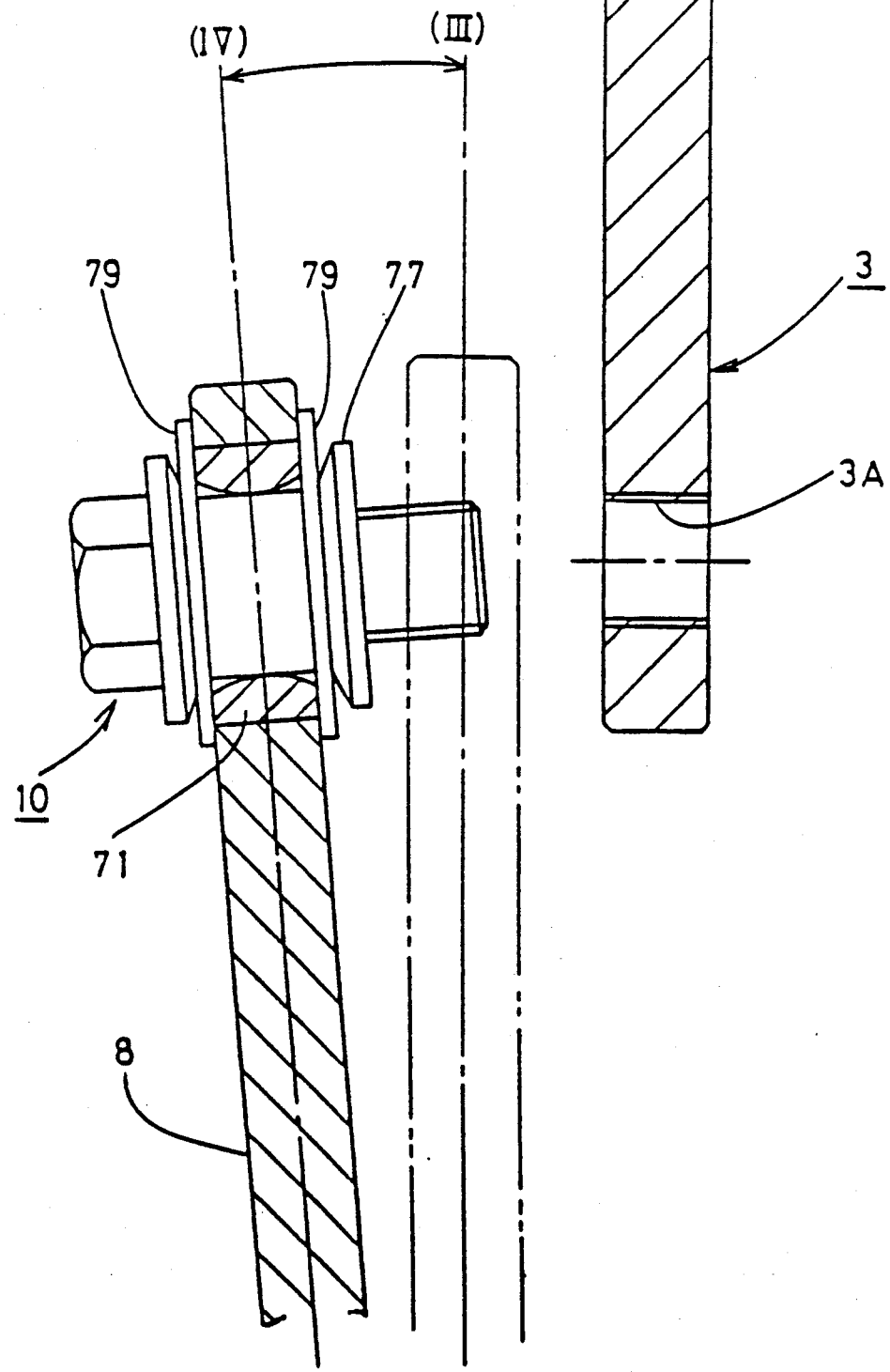

Actuation is described in accordance with the above-stated embodiment. The link rod 8 can be inclined from the state perpendicular to the hinging bolt 9 (III) to the inclined state (IV) as illustrated in FIG. 14(a) and FIG. 14(b) because the link rod 8 coupled with the side of motor 5 is coupled with the swinging arm 7 by the link joint of the present embodiment. The falling pillar 3 and the link rod 8 are connected by the hinging bolt 10. The hinging bolt 10 is screwed in a fastening hole 3A and is fixedly connected to the falling pillar 3 by the screw locking medicine being applied to the hinging bolt 10. As the link system 19 coupled with the swinging arm 7 via the link joint and the link rod 8 is moved reciprocally by the swinging arm 7 by driving of the motor 5, the top 12 is smoothly actuated from the closed state (I)

to the opened state (II) or from the opened state to the closed state as illustrated in FIG. 1.

In the above-stated embodiment, it does not matter if the boss 71 of the link rod 8 whose inner hole forms a curved face projecting smoothly from both sides for central part is directly formed in the link rod 8.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A drive device for opening and closing a vehicle top comprising: a top member forming an upper part of a vehicle body; a falling pillar swingably supporting the top member on the vehicle body; a pair of forming bars pivotally positioned on the falling pillar; a pair of control devices, each of which is fixed in a side of the vehicle body; and inclinable link rods, each of which couples the falling pillar with one of the control devices, each of said control devices including:

a swinging arm connected to the link rod;
an output shaft for rotating the swinging arm;
a housing in which is rotatably positioned at least a portion of the output shaft;
driving means attached to the housing and generating a rotary driving force;
a first reduction gear stage formed as a worm drive which is coupled with the driving means and housed in the housing;
a second reduction gear stage formed as a spur gear drive coupled with the worm drive for driving the output shaft and housed in the housing;
a transmission gear included in the second reduction gear stage and having a connecting pawl projecting from a side thereof;
a gear shaft rotatably positioned in the housing and rotatably supporting the transmission gear;
a clutch disk positioned on the gear shaft in an axially displaceable manner, said clutch disk being substantially rotationally fixedly positioned on the gear shaft, said clutch disk having a connecting concave part on one side thereof for generating a claw clutch engagement with the connecting pawl of the transmission gear, said clutch disk having a connecting annular groove formed therein;
a clutch-disengaging member having a semi-circular connecting convex part which is inserted into the connecting annular groove of the clutch disk;
an operating shaft positioned within the housing, said clutch-disengaging member being positioned on said operating shaft; and
screw means for thrusting the operating shaft in order to enable manual opening and closing of the top member.

2. The drive device of claim 1, including a spring provided on the gear shaft for imparting a spring force that normally biases the clutch disk in the direction of the transmission gear to generate the claw clutch engagement between the connecting pawl of the transmission gear and the connecting concave part of the clutch disk, wherein the operating shaft is adapted to be thrusted into the housing for disengaging the claw clutch engagement.

3. The drive device of claim 1, wherein the connecting pawl projects outwardly from a side of the transmission gear and the connecting concave part is formed in the side of the clutch disk so that the claw clutch engagement is generated with the connecting pawl.

4. The drive device of claim 2, wherein said operating shaft has a projecting part extending out of the housing with an interlocking member fixed on an end of the projecting part, and including an operating bolt extending freely through a hole in said interlocking member and into a threaded hole in said housing.

* * * * *